UNITED STATES PATENT OFFICE

WALTER S. BAYLIS, OF LOS ANGELES, CALIFORNIA, ASSIGNOR TO FILTROL COMPANY OF CALIFORNIA, OF LOS ANGELES, CALIFORNIA, A CORPORATION OF CALIFORNIA

METHOD OF FILTERING OILS THROUGH PAPER

No Drawing.   Application filed August 5, 1929. Serial No. 383,658.

This invention relates to a process of filtering oils, particularly mineral oils, through a filter paper containing an activated clay so that, as a result, the filtration of the oil, the removal of most of its color, and the removal of its colloidal impurities are brought about in one operation.

The present application is a continuation in part of my co-pending case, Serial No. 274,364, filed May 1, 1928.

The paper by means of which the method is practiced is made by incorporating such an amount of an acid-activated finely divided bentonitic clay into filter paper pulp or blotting paper pulp as will result in a dry paper containing from 10% to 25% by weight of the clay. I prefer a paper having about 20% of clay. More than 25% deleteriously affects the mechanical strength of the paper, while less than 10% does not confer enough decolorizing power.

The particular acid-activated clay that I prefer to use in the paper is known commercially at present as "Filtrol." It is made by a process somewhat similar to that disclosed in U. S. Patent No. 1,397,113 to P. W. Prutzman, that is, by treating a clay with sulphuric acid and then washing out the soluble reaction products except minute traces of acid. In the manufacture of the paper, suitable precautions are taken to insure that the clay is uniformly distributed, and the paper should be fine enough and at least as thick as the usual blotting paper to prevent loss of clay into the filtrate as the liquid goes through the paper.

In using the paper, I prefer that the oil or other liquid to be filtered shall have been first given a preliminary "contact filtration" with acid-activated clay or fullers earth and the liquid separated from the adsorbent. From this it will be understood that the filtration through paper is generally a final step. If no great amount of color or sediment is to be removed from the liquid, however, it may be passed directly through the special paper, preferably while the liquid is hot.

The paper is held preferably in the usual style of filter press. That is to say, it takes the place of the usual filter cloths used in such presses. It may, however, be used in conjunction with filter cloth, so that the latter is behind the paper. In the case of mineral lubricating oil, the temperature of the oil at time of filtration should be at least 180° F. and not over 250° F. This range is chosen so that an efficient decolorizing action will be had, yet that the paper will not be charred.

In filtering and decolorizing gasoline, contact filtration or preliminary acid treatment may be given the gasoline. No heating is necessary during any of the decolorizing or filtering operations. Since it has been found that decolorization occurs most efficiently under acid conditions, concentrated (66° Bé.) sulphuric acid may be incorporated in the gasoline before the latter is filtered through the paper. The amount of acid so added should range from between .5% to 3% by weight of the clay present in the paper through which the gasoline is to be passed, or say $\frac{1}{10}$% of acid on the weight of the gasoline. It is to be understood, however, that efficient decolorization will result from the passage of substantially neutral gasoline through filter paper containing activated clay, and such procedure forms part of my invention.

Not only gasoline may be treated as above described, but also benzine, naphtha, ligroin, and kerosene.

I claim as my invention:

1. The process of filtering and decolorizing oil simultaneously, which comprises heating the oil, subjecting it to a preliminary contact filtration with an adsorbent, preliminarily separating the adsorbent from the oil and then subjecting the oil to a final filtering and decolorizing process by passing it through a filtering paper containing from 10% to 25% by weight of an adsorbent, the oil being hot while being passed therethrough.

2. A process according to claim 1 in which the oil is at a temperature of from 180° F. to 250° F. while being filtered through the paper.

3. In the process of filtering and decolorizing the light distillates of petroleum, the step which comprises acidifying them and then filtering them through a porous paper which contains from 10% to 25% of its weight of acid-activated clay.

4. A process according to claim 3 in which sulphuric acid is used for acidification of the distillates.

5. A process according to claim 3 in which strong sulphuric acid is used to acidify the distillates, said acid being present therein in amounts not exceeding 3% of the adsorbent clay in the paper through which they are to be filtered.

6. The method of decolorizing oils which comprises preliminarily decolorizing said oils and separating the bulk of the refining agent therefrom, then passing the oil through a filter cloth which is backed by a filter paper containing from 10% to 25% of a clay adsorbent material.

In testimony whereof, I have hereunto set my hand at New York, New York, this 25 day of July, 1929.

WALTER S. BAYLIS.